FIP8303 OR RE 3,227

Sliding Breech-block,
Rearward, Pivoted Hammer,
Magazine.

DRAFTSMAN.

B. T. HENRY.

Magazine Fire-Arm.

Re 3,227.

Reissued Dec. 8, 1868

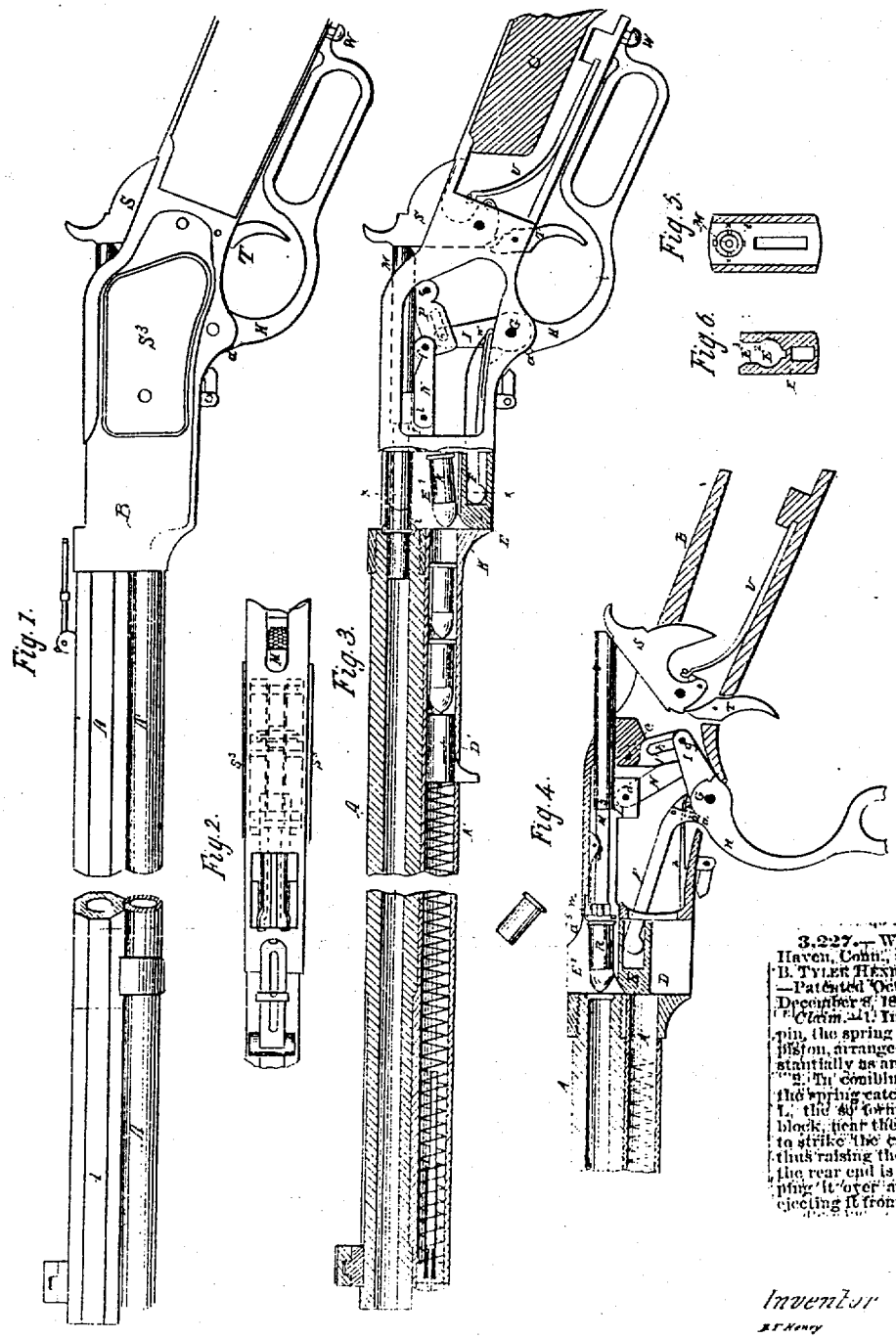

3,227.—WINCHESTER ARMS COMPANY, New Haven, Conn., assignees by mesne assignments of B. TYLER HENRY, sole assignee, *Magazine Fire-Arm.*—Patented October 16, 1866; No. 59,146; reissued December 8, 1868; [illegible] days; [illegible] years.

*Claim.*—1. In combination with the hollow breech pin, the spring catch *m*, on the breech pin, and the piston, arranged for central or rim fire, or both, substantially as and for the purpose set forth.

2. In combination with the carrier-block *F* and the spring catch *m*, placed on top of the breech pin L, the shoulder of the top of the said carrier block, near the rear end, as shown at *b*, Fig. 4, as to strike the cartridge forward of the center, and thus raising the forward end of the cartridge, while the rear end is held down by the spring catch, tripping it over and freeing it from the spring, and ejecting it from the gun, substantially as described.

Inventor
B. T. Henry
By his Attorney
John E. Earle

B. T. HENRY.
Magazine Fire-Arm.
No. 3,227. Reissued Dec. 8, 1868
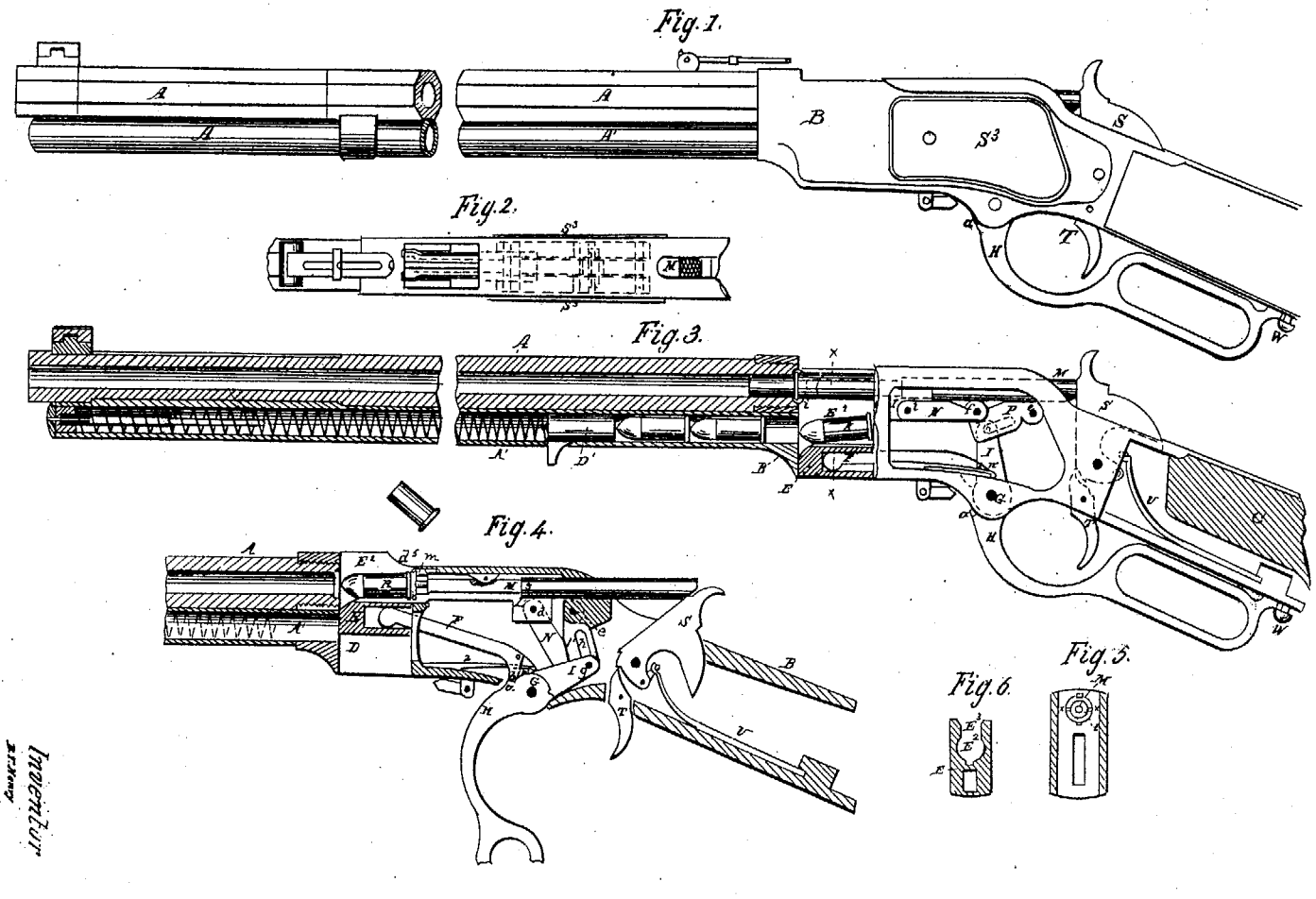
Inventor
B. T. Henry
By his Attorney
John E. Earle
N. PETERS, PHOTO-LITHOGRAPHER, WASHINGTON, D. C.

United States Patent Office.

WINCHESTER ARMS COMPANY, OF NEW HAVEN, CONNECTICUT, ASSIGNEES, BY MESNE ASSIGNMENTS, OF B. TYLER HENRY, OF SAME PLACE.

*Letters Patent No.* 30,446, *dated October* 16, 1860; *reissue No.* 3,227, *dated December* 8, 1868.

IMPROVEMENT IN MAGAZINE FIRE-ARMS.

The Schedule referred to in these Letters Patent and making part of the same.

*To all whom it may concern:*

Be it known that B. TYLER HENRY, of New Haven, in the county of New Haven, and State of Connecticut, invented a new Improvement in Magazine Fire-Arms; and the following is declared, when taken in connection with the accompanying drawings, and the letters of reference marked thereon, to be a full, clear, and exact description of the same, and which said drawings constitute part of this specification, and represent, in—

Figure 1, a side view of the arm complete.

Figure 2, a top view.

Figure 3, a sectional side view.

Figure 4, a longitudinal central section.

Figure 5, a section through the frame on line *x x*, looking to the rear.

Figure 6, a section of the carrier-block on the same line.

This invention relates to an improvement in the arm for which Letters Patent were granted to Horace Smith and Daniel B. Wesson, dated February 14, 1854, in which several metallic cartridges are placed in a tube or magazine, beneath the barrel of the arm, and carried therefrom to the barrel by the movement of the trigger-guard.

The object of this invention is to overcome certain objections which exist in that arm:

First, in the manner of discharge.

Second, to make more certain the retraction of the discharged shell, (or cartridge, if need be;) also in throwing the shell from the arm after it has been withdrawn from the barrel.

The construction of the operative parts of the arm will first be described.

A is the barrel, of any known construction.

B, the frame, to the forward end of which the barrel is secured, and to the rear end a wooden stock, C.

In the frame B, and directly in the rear of the barrel, is formed a chamber or mortise, D, in which is placed a carrier-block, E, the office of which is to receive a cartridge from the magazine, and raise it for insertion into the barrel; also to throw the discharged shell from the arm after it has been withdrawn from the barrel for this purpose.

The said carrier-block E is constructed with a chamber, $E^2$, (see fig. 6,) to receive the cartridges from the magazine, and it is moved up within the chamber or mortise D, to present the cartridge to the barrel, in a line with the bore, for insertion, and down when the cartridge has been removed from the carrier to the barrel, and is thus moved by means of the lever F, one end of which lies within the carrier-block E, the other hung to the pivot G.

H is a lever, serving both as a trigger-guard and as an instrument by which the several mechanical parts of the arm are made to operate. It is hung to the pivot G, upon which both the levers F and H may be freely moved.

By moving the lever H from the position denoted in fig. 3 to that denoted in fig. 4, a shoulder, *a*, formed upon the lever H, strikes a corresponding shoulder, *b*, upon the lever F, raising the said lever and carrier-block E, as denoted in fig. 4, by returning the said lever H.

The upper arm, I, of the lever H, strikes another shoulder, *c*, on the said lever F, and returns the lever F, with the carrier-block E, to the position denoted in fig. 3.

L, the breech-pin, is hollow, of cylindrical form, through which passes a piston or firing-pin, M.

The rear end of the said pin L is formed, as seen in figs. 3 and 4, so as to attach upon either side, to a pivot, *d*, a link, N, of a toggle-joint, as denoted in broken lines, fig. 2.

The other links, P, of the toggle are hinged to the frame by a pivot, *e*, and the two links hinged together at *f*.

The upper arm, I, of the lever H, extends up between the two toggle-joints, and through the said arm I, a pin, *g*, passes, extending out upon either side, so as to enter a slot or groove, *h*, upon the inside of the links P, so that as the lever H is moved, as from the position in fig. 3 to that in fig. 4, the pin *g* will act to close the toggle and draw back the breech-pin L, which moves freely back and forth in the frame B, as denoted in fig. 4, and, by the return of the lever H, will extend the toggle, and return the breech-pin L, as seen in fig. 3.

The raising of the carrier-block E, as before described, occurs after the breech-pin has been drawn back, and the breech-pin is returned before the return of the carrier-block, passing through the chamber $E^2$, in the carrier-block, for the purpose (as more fully hereafter shown) of removing the cartridge from the chamber $E^2$, in the carrier-block, to the barrel; therefore, in order to allow the carrier-block to return, it is necessary to cut a slot, $E^3$, from the chamber $E^2$, up through the carrier-block, as seen in fig. 6. This slot must be narrower than the chamber, in order to prevent the accidental removal of the cartridge in the said chamber, as also to cause the raising of the carrier-block to eject the discharged and withdrawn shell; and that this narrow slot may pass down over the breech-pin, which is nearly the same diameter as the chamber in the carrier-block, the breech-pin is reduced upon the two sides, as seen in figs. 2 and 3.

On the lower side of the breech-pin L is formed a projecting lip or rest, *i*, and upon the upper side, a spring-latch, *m*. A cartridge, R, lying upon the carrier-block, as seen in fig. 4, will, by the return of the breech-pin L, be forced into the rear of the barrel, the lip *i* entering a recess, *n*, below, and the latch *m*, rising and hooking over the flange of the cartridge, will enter a similar recess, *r*, above, as seen in fig. 3, so that when the breech-pin is withdrawn, the latch *m* will hold and withdraw the cartridge or discharged shell, as the case may be.

The piston M is enlarged to form a shoulder, as denoted at *s*, at the rear of the pin L, thence extends back through the frame, so as to slide freely therein, to the hammer S, so that when the pin is drawn back, as before described, the said piston will force the hammer back to full cock, as denoted in fig. 4, and, on being returned to the position denoted in fig. 3, will leave the hammer held at full cock by the trigger T, which, when released in the usual manner, will, by the reaction of the main-spring U, fly back to the position denoted in fig. 3, striking the end of the piston M.

To the inner end of the piston M is fixed a collar, *t*, having projecting points, *x*, upon either side. (See fig. 5.) The said collar *t* is of larger diameter than that part of the piston M to which it is attached, and the recess made in the breech-pin to receive the said collar is made a little deeper than the thickness of the collar, so as to allow the piston M, with the collar *t*, to move back, so that when the pin L is forced up against the cartridge, as before described, the projecting points *x*, as they press against the cartridge, will force the piston back, and thus situated, when the hammer strikes the piston M, as before described, the projecting points *x* will indent the metal of the cartridge sufficiently to explode the fulminate, and ignite the powder within the cartridge.

This adaptation of the breech-pin, it will be observed, is for the discharge of cartridges constructed for rim-fire, that is to say, those which have the fulminate within a rim around the base of the cartridge-shell. If for cartridges constructed for central fire, the points *x* will not be required, but a central point upon the piston M should be arranged so as to strike or pierce the centre of the cartridge; and, if preferred, both points *x*, and a central point, may be arranged, so that the same arrangement would discharge either rim or central-fire cartridges, as no harm can occur from striking or piercing the centre of the rear end of a rim-fire cartridge.

A separate spring, *z*, for each of the levers F and H, is secured upon the frame, the end of one of which bears upon the lever H, as seen in fig. 3, to retain the lever in its home position, as in figs. 1 and 3, the other upon the lever F, (see fig. 4,) for the purpose more fully hereafter described.

The lever H is held in its position, against the frame, by means of a thumb-screw, W, or an equivalent therefor. This completes the general construction of that part of the arm contained within the frame, as heretofore constructed.

The space in the frame where the operative parts are placed, is enclosed by a plate, $S^3$, upon each side of the frame.

Beneath the barrel A, the magazine A′ is arranged, which consists of a metallic tube, extending along the under side of the barrel, and secured thereto in any convenient manner, and opening through the frame into the carrier-block, as seen in figs. 3 and 4.

Within the tube is arranged a plug or plunger, D′, having a tail-piece projecting through a slot formed upon the under side of the tube, as seen in figs. 3 and 4; and upon the said plug, and between that and the forward end of the tube or magazine, is arranged a spiral spring, as denoted in red, the tendency of which is to force the plug toward the carrier-block or frame.

The upper end of the said tube is formed so as to swivel upon the barrel, as seen in fig. 3, so that when the plug has been drawn up, so as to pass with the spring into the said upper end, then the said upper end is turned upon the barrel, so as to open the tube or magazine; then into the magazine, at the open end, the several cartridges are inserted, their rear end down, until the requisite number is placed therein, or until the magazine is filled, and when so filled, the upper end of the magazine is returned, and the plug D′ is forced down upon the column of cartridges within the magazine.

A spring, within the magazine, will force the column of cartridges down, until the first one, R, fig. 3, inserted will enter the chamber $E^2$ of the carrier-block, from which position it will be carried up to the position in fig. 4, and inserted into the barrel, and the block returned to receive a second cartridge, as before described.

When the first cartridge has been discharged, the latch *m*, upon the breech-pin, will hold the discharged shell until the carrier-block E is again raised.

The recess $E^2$, in the carrier-block, is narrower than the diameter of the cartridge-shell, and the rear end of the carrier-block is cut away, as at $d^3$, fig. 4, so that the cartridge-shell is struck by the block forward of the flange, and the shell being still held by the latch *m*, the forward end of the cartridge is tipped up until the carrier-block is nearly up to its full height, then the spring *z* will fall into a notch, *w*, on the lever F, giving a sudden movement to the carrier, which will eject the discharged shell entirely from the arm, as denoted in fig. 4, and thus the operation of firing may be continued until all the cartridges within the magazine have been, each in its turn, discharged.

The lip *i* is represented as a rest for the flange of the cartridge, but this is not essential, inasmuch as the latch itself is all-sufficient to hold the shell firmly against the breech-pin, so as to withdraw the shell from the barrel, it being supported on the under side by the top of the carrier-block, upon which it slides.

In the original arm, patented as aforesaid, there was no piston arranged, consequently there could be no over motion for the discharge, as has been described for the piston within the breech-pin; therefore the hammer, striking upon the end of the solid breech-pin, resting solidly on the cartridge, was not certain to explode the fulminate, whereas, by the additional motion given by the piston, as has been described, the discharge is positive and certain. Thus the objections which exist in that construction have been overcome.

By the foregoing it will be observed that the breech-pin complete, (thus moved back and forward, and held firmly in its place against the breech of the gun during the discharge, by the action of a lever on the toggle-joints, in the manner described, or by any equivalent mechanical device,) consists of three principal parts:

First, a hollow cylinder, of iron or steel, of a diameter depending upon and equal to the diameter of the head of the cartridge used, with projecting lugs, against which the toggle-joints, or other mechanical substitutes for them, act, to move it and hold it to its place.

Secondly, of a piston or firing-pin, passing through the cutter.

Thirdly, of an extractor, constructed as before described, and performing the following important functions:

First, it is moved forward, by the action of the proper force, against the lugs, and carries the cartridge out of the receiver or carrier, home to its place in the chamber, pressing it firmly home.

Second, it acts as a solid breech, closing the rear of the barrel gas-tight, and holding the copper shell firmly in its place during the discharge.

Third, it withdraws or retracts the empty cartridge (or the entire charge, if it misses fire,) entirely out of the barrel into the chamber of the carrier or receiver, out of which it is ejected by the upward motion of the latter.

Fourth, as the breech-pin moves back, the rear end of the piston or firing-pin acts upon the hammer, and carries it to a full cock.

Fifth, the firing-pin receives the blow given by the main-spring, which is thus conveyed to the head of the cartridge, and ignites it with great certainty.

Having fully described the construction of the arm, and the adaptation of the improvements,

What is claimed as the invention of the said B. TYLER HENRY, and desired to be secured by Letters Patent, is—

1. In combination with the hollow breech-pin, the spring-catch *m*, on the breech-pin, and the piston, arranged for central or rim-fire, or both, substantially as and for the purpose set forth.

2. In combination with the carrier-block E and the spring-catch *m*, placed on top of the breech-pin L, the so forming of the top of the said carrier-block, near the rear end, as shown at $d^5$, fig. 4, as to strike the cartridge forward of the centre, and thus raising the forward end of the cartridge, while the rear end is held down by the spring-catch, tripping it over and freeing it from the spring, and ejecting it from the gun, substantially as described.

WINCHESTER ARMS COMPANY,
(By O. F. WINCHESTER, *President*,)
*Assignees, by mesne assignments, of B. Tyler Henry.*

Witnesses:
J. H. SHUMWAY,
A. J. TIBBITS.